Aug. 20, 1940.   P. VAN SITTERT ET AL   2,212,332
FLUID ACTUATED TOOL
Filed Dec. 21, 1938   2 Sheets-Sheet 2
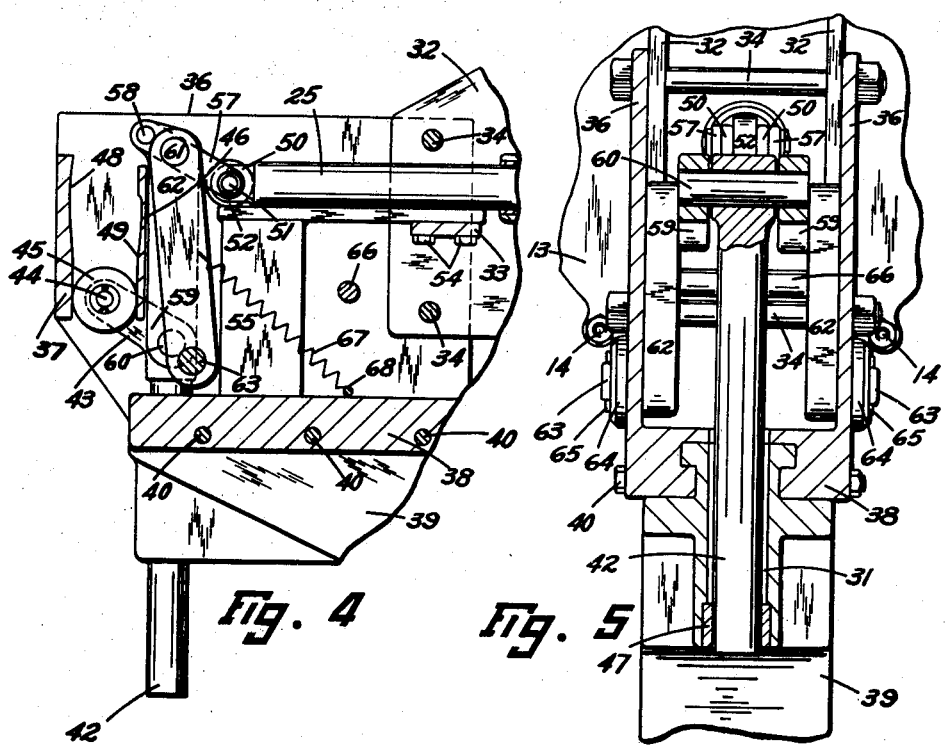
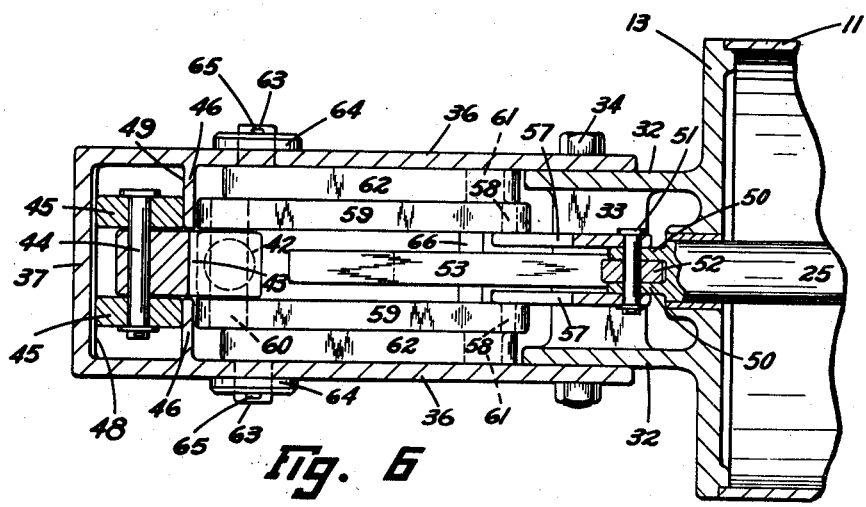
INVENTORS
LLOYD G. SPETH &
PAUL VAN SITTERT
BY
ATTORNEY Patented Aug. 20, 1940

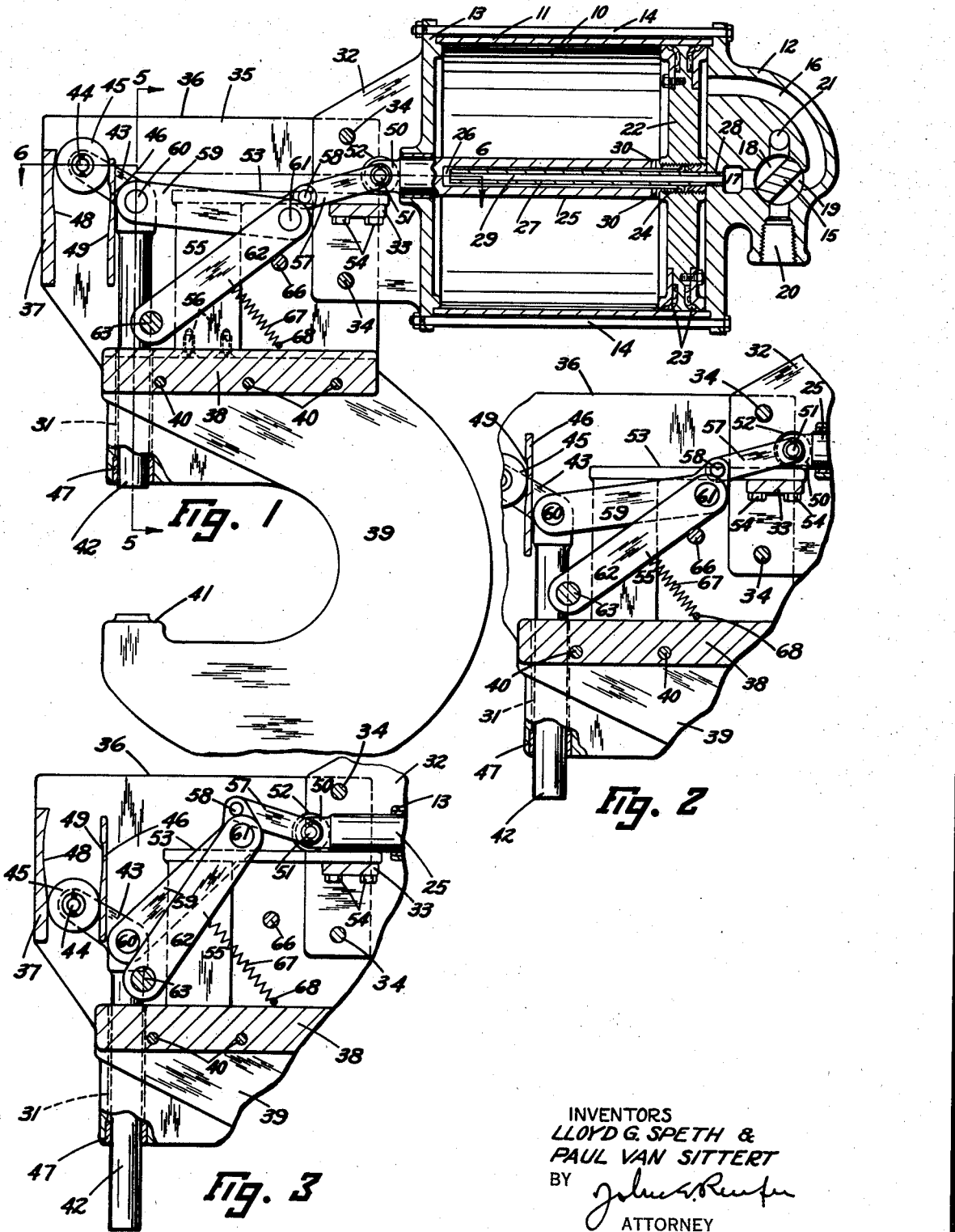

2,212,332

UNITED STATES PATENT OFFICE 2,212,332

FLUID ACTUATED TOOL

Paul Van Sittert, Cleveland Heights, and Lloyd G. Speth, Cleveland, Ohio, assignors to The Cleveland Pneumatic Tool Company, Cleveland, Ohio, a corporation of Ohio Application December 21, 1938, Serial No. 247,038

6 Claims. (Cl. 74—110)

This invention relates broadly to machines for performing such work as riveting, punching, stamping, shearing, pressing or the like wherein variable pressure instead of impacts is applied on the work.

One object of this invention is to produce such machine wherein the initial pressure applied on the work is effected by a rapid movement of the working tool, which movement is gradually made slower to increase the pressure applied on the work as the pressure required to perform the work increases.

Another object of this invention is to produce an improved portable press having the driving unit located at substantially right angles with the driven unit, the whole assembly forming a simple and compact construction which is strong, durable and efficient.

Other objects and advantages more or less ancillary to the foregoing reside in the specific construction and aggroupment of the elements peculiar to this structure, as will become apparent from a more complete examination of this specification.

In the drawings:

Fig. 1 is a longitudinal view, partly in section, of a machine embodying the invention. In this view, the tool is shown at the beginning of its working stroke.

Figs. 2 and 3 are views similar to Fig. 1 illustrating a portion of the assembly with the working tool at two different stages of its working stroke.

Fig. 4 is a view similar to Figs. 2 and 3 showing the tool at the end of its working stroke.

Fig. 5 is an enlarged cross sectional view taken in a plane indicated by line 5—5 in Fig. 1.

Fig. 6 is an enlarged longitudinal sectional view taken in a plane indicated by line 6—6 in Fig. 1.

Referring to the drawings, 10 generally indicates a fluid actuated reciprocable motor including a cylinder 11 having its right end in Fig. 1 closed by a head 12 and its left end by a bracket 13, both of which are secured to the cylinder by bolts 14. A throttle valve 15 is rotatable within the head 12 for controlling fluid passageways 16 and 17, which throttle valve is provided with grooves 18 and 19 capable of communication with an inlet port 20 and an exhause port 21.

Reciprocable within the cylinder 11, there is a fluid actuated member or piston 22 equipped with piston rings or packings 23 in fluid tight engagement with the cylinder 11. This piston includes a piston rod 25 threaded in the piston as at 24 and extending through the bracket 13 in fluid tight engagement therewith. A bore 26 is provided within the rod 25 to receive a stem 27 which extends through the piston 22 into the head 12 where it is held in position by a screw thread connection 28. Through the stem 27, there is provided a passageway 29 affording constant communication of the passageway 17 with the bore 26 of the rod 25, which bore opens into the cylinder 11 on the left side of the piston 22 in Fig. 1, through radial ports 30.

The bracket 13 which closes the inner end of the cylinder 11, is formed with two parallel side walls 32 united by a bridge or cross wall 33. To these side walls is secured by bolts 34, a frame 35 including two parallel plates 36 united by a cross end wall 37 and a bottom wall 38. A substantially U-shaped yoke 39 is rigidly secured to the bottom wall 38 by cross bolts 40, which yoke has one end turned upwardly as at 41 to adjustably receive a stationary tool or die (not shown). Through the bottom wall of the frame 35 and the adjacent portion of the yoke 39, there is formed a bore 31 accommodating within the lower end thereof a relatively short bushing 47 through which is free to slide a plunger or tool 42, which tool in practice is capable of adequate cooperation with a similar tool or die which may be carried by the portion 41 of the yoke 39, for acting on the work placed therebetween. The upper end of the tool 42 is formed with an angularly upwardly extending knuckle 43 carrying a cross shaft 44 having mounted thereon two rollers 45 located one on each side of the knuckle 43, and capable of engagement with two substantially vertical tracks 48 and 49, the former being formed interiorly of the cross wall 37, while the latter is formed on similar cross walls 46 extending inwardly part way from the side plates 36 of the frame 35 as clearly shown in Fig. 6. In practice, the upper portions of the tracks 48 and 49 are somewhat concaved to enable slight lateral movement of the tool 42 as will be explained later.

The outer end of the piston rod 25 is provided with a clevis 50 carrying a cross shaft 51 on which is operatively mounted within the clevis 50, a roller 52 engaging a substantially horizontal track 53 secured at one end to the bridge 53 by bolts 54, and provided at the other end with a supporting wall 55 resting on the bottom wall 38 of the frame 35 and secured thereon by screws 56. The track 53 is narrower than the outside width of the clevis 50 enabling pivotal movement of two auxiliary links 57 each having one end mounted on the cross shaft 51, while the other end is formed with an integral trunnion 58. Extending from each link 57, there is a substantially L-shaped lever or driving link 59, having the free end of the short arm thereof pivotally mounted on the trunnion 58, while the free end of the long arm thereof is pivotally mounted on the cross shaft 60 carried by the upper portion of the tool 42. At the inner end of each link 59, below the trunnion 58, there is provided a trunnion 61 having pivotally mounted thereon one end of a supporting link 57 extending therefrom in acute angular relation with the link 59 to a point below the link 59 where it is pivotally connected to the frame 35 by a tunnion 63 which extends through the adjacent side plate 36, and is held in position by a washer 64 and a cotter pin 65. The links 59 and 62 actually form a toggle joint having one end pivotally connected to the upper end of the tool 42 and the other end to the frame 35, which toggle joint may be acted upon by the piston rod 25 as will be explained later. When the piston 22 is positioned at the beginning of its working stroke, the supporting links 62 are made to rest on the cross pin 66, and are constantly urged in that position by a tension spring 67, which has one end attached to the link 62 and the other end to a pin 68 secured to the side plate 36 of the frame 35.

In the operation of the mechanism, with the parts positioned as shown in Fig. 1, motive fluid admitted into the inlet port 20 will flow on the right side of the piston 22 through the valve groove 19 and the passageway 16, thereby acting on the piston 22 for driving it toward the bracket 13. During the initial movement of the piston rod 25, pressure from the piston 22 is exerted on the ends of the links 59 through the links 57 and trunnion 58. In this instance, the position of the trunnions 58 relative to the links 62 is such that pressure exerted thereon by the piston rod 25 would normally tend to rotate the links 62 and consequently the links 59 in a clockwise direction in Fig. 1, which rotation in that direction is prevented by the links 62 resting on the cross pin 66, thereby causing the links 62 to remain momentarily stationary and the links 59 to rotate on the trunnions 61 in a counterclockwise direction in Fig. 1, which rotation causes the tool 42 to move toward the work at a much greater rate of speed than that of the piston rod 25 as shown by the relative position of the piston rod and tool in Figs. 1 and 2. During this initial rotation of the links 59 on the momentarily stationary trunnions 61, the relatively short bushing 47 within the lower end of the bore 31 and the rollers 45 located between the concaved portions of the tracks 48 and 49, will enable a slight lateral movement of the tool 42 resulting from the rotation of the links 59.

Subsequently, as the piston 22 continues in its forward stroke, the trunnions 58 having been moved closer to the center axis of the piston rod 25, will now move upwardly with the links 57 rotating in a clockwise direction on the cross shaft 51, causing the supporting links 62 to rotate on the trunnions 63 and the links 59 to move gradually into lengthwise position relative to the tool 42. In this instance, the rate of speed of the tool 42, heretofore greater than that of the piston rod 25, will gradually be reduced to a speed slower than that of the piston, causing the tool when it approaches the end of its working stroke, that is when it moves from the position in Fig. 3 to the position in Fig. 4, to travel at a much greater rate of power than that normally developed by the piston 22.

During the working stroke of the piston 22 and piston rod 25, the rod is maintained in coaxial alignment with the cylinder 11 due to the operative engagement of the roller 52 with the substantially horizontal track 53, on which track is distributed the downward thrust to which the piston rod 25 is subjected. Similarly the side thrusts to which the tool 42 is subjected by the action of the links 59, is also resisted by the operative engagement of the rollers 44 with the vertical track 48.

As the piston 33 moves toward the bracket 13, motive fluid previously admitted within the cylinder 11 on the left side of the piston 22, is free to exhaust therefrom via the radial ports 30, the piston rod bore 26, the passageway 29 formed through the stem 27, the ports 17, the valve groove 18 and the exhaust port 21.

When the plunger 42 has performed the work desired, the throttle valve 15 may be turned 90° to bring the inlet passageway 20 in communication with the passageway 17 via one of the valve grooves 18 or 19, and the exhaust port 21 in communication with the passageway 16. In this instance motive fluid is admitted on the left side of the piston 22 via the port 17, passageway 29, bore 26, and radial ports 30, causing the piston 22 and its appurtenant piston rod 25 to slide toward the head 12. In this instance, the piston rod 25 acting through the linkage mechanism will withdraw the plunger 42 from the work, initially at a greater rate of power than that of the piston rod 25, which rate of power, will gradually decrease as the piston approaches the end of its return stroke and will finally become less than that of the piston rod when the links 62 engaged the cross pin 66. Thereafter during a very short travel of the piston rod, the plunger 42 will again be moved from the position in Fig. 2 to the position in Fig. 1 at a greater rate of speed than that of the piston.

During the return stroke of the plunger 42, the lateral pull which would normally prevent free slidable movement of the plunger 42 is resisted by the operative engagement of the rollers 45 with the vertical tracks 49. As the piston 22 moves toward the back head 12, the motive fluid previously admitted on the right side of the piston 22 is now free to exhaust from that portion of the cylinder through the passageway 16, one of the valve grooves 18 or 19 and the exhaust port 21.

From the foregoing description, it will be understood that with the present construction, the plunger 42 is moved to contact the work at a rate of speed much higher than that of the piston 22, which rate of speed gradually decreases as the piston 22 reaches the end of its stroke, thereby exerting pressure on the plunger 42 at a greater rate of power than that normally developed by the piston 22. When withdrawing the plunger from the work, the initial withdrawing power of the plunger is much greater than that of the piston 22, a feature which has been advantageous in withdrawing the plunger from the work after operations such as punching or shearing. After the plunger is once retracted from the work and free from excessive load resulting from its frictional engagement with the work, it is automatically returned to the initial position shown in Fig. 1 at a greater rate of speed than that of the fluid actuated member of piston 22.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

We claim:

1. A motion transmitting mechanism between a power actuated slidable member and a tool slidable transversally of said member in a tool supporting frame, including a substantially L-shaped driving link pivotally connected at one end to said tool, an auxiliary link pivotally connecting the other end of said driving link to said member, a supporting link, a pivotal connection between said driving link and one end of said supporting link, and a pivotal connection between the other end of said supporting link and the frame supporting said tool, said last named connection being located below the connection between said driving link and tool relative to the direction of working motion of said tool.

2. A motion transmitting mechanism between a power actuated slidable member and a tool slidable transversally of said member in a tool supporting frame, including a pair of movable links normally extending laterally of said tool, a pivotal connection between the inner ends of said links, a pivotal connection between the outer end of one of said links and the upper end of said tool, a pivotal connection between the outer end of the other of said links and the frame supporting said tool, and means transmitting pressure from said member to said links at a place adjacent the inner ends thereof resulting in the rotation of said links in the same direction from a lateral to a substantially lengthwise position relative to said tool.

3. A motion transmitting mechanism between a power actuated slidable member and a tool slidable transversally of said member in a tool supporting frame, including a substantially L-shaped driving link, a pivotal connection between the free end of the longest arm of said link and said tool, an auxiliary link pivotally connecting the free end of the shortest arm of said driving link to said member, a supporting link for said driving link having one end pivotally connected thereto beneath the connection between said driving and auxiliary links, and a pivotal connection between the other end of the supporting link and said tool supporting frame.

4. A motion transmitting mechanism between a power actuated slidable member and a tool slidable tranversally of said member in a tool supporting frame, including a driving link and a supporting link normally extending laterally from said tool, a pivot for one end of said driving link carried by said supporting link, a pivotal connection between the other end of said driving link and said tool, a pivot for said supporting link carried by said frame below said driving link, and means transmitting power from said member o said driving link in a manner resulting in the initial rotation of said driving link around its pivot and subsequent rotation in the same direction of said links around the pivot of said supporting link from a lateral to a substantially lengthwise position relative to said tool.

5. A motion transmitting mechanism between a power actuated slidable member and a tool slidable transversally of said member in a tool supporting frame, including a bell-crank lever having one arm acted upon by said member and another arm operatively engaging said tool, a pivot for said lever, and a swingable supporting link for said pivot operatively carried by said frame enabling initial rotation of said lever on its pivot and subsequent rotation in the same direction of said lever and link from a lateral to a substantially lengthwise position relative to said tool.

6. A motion transmitting mechanism between a power actuated slidable member and a tool slidable transversally of said member in a tool supporting frame, including a bell-crank lever having one arm acted upon by said member and another arm operatively engaging said tool, a pivot for said lever, a swingable supporting link for said pivot operativey carried by said frame, a stop on said frame limiting swinging movement of said link in one direction, and spring means constantly urging said link against said stop.

PAUL VAN SITTERT.
LLOYD G. SPETH.